(12) United States Patent
Hobson et al.

(10) Patent No.: US 8,495,354 B2
(45) Date of Patent: Jul. 23, 2013

(54) APPARATUS FOR DETERMINING DURING A POWER-ON SEQUENCE, A VALUE TO BE WRITTEN TO A FIRST REGISTER IN A SECURE AREA AND THE SAME VALUE TO A SECOND REGISTER IN NON-SECURE AREA, WHICH DURING A PROTECTED MODE, THE VALUE IS COMPARED SUCH THAT IF IT IS EQUAL, ENABLING WRITING TO A MEMORY

(75) Inventors: Louis B. Hobson, Houston, TX (US); Mark A. Piwonka, Houston, TX (US); Gregory P. Ziarnik, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 825 days.

(21) Appl. No.: 12/237,100

(22) Filed: Sep. 24, 2008

(65) Prior Publication Data
US 2010/0077199 A1    Mar. 25, 2010

(51) Int. Cl.
*G06F 9/00*      (2006.01)
*G06F 1/24*      (2006.01)

(52) U.S. Cl.
USPC .............. 713/100; 713/178; 713/1; 713/103; 711/102; 711/103; 711/100; 365/232; 375/242; 712/226

(58) Field of Classification Search
USPC ..... 711/102, 103, 100; 726/2, 22, 1; 713/100, 713/1, 178; 712/226; 375/242; 365/232
See application file for complete search history.

(56) References Cited

U.S. PATENT DOCUMENTS

| | | | |
|---|---|---|---|
| 5,944,821 A * | 8/1999 | Angelo ........................... 726/22 |
| 6,073,206 A * | 6/2000 | Piwonka et al. ............... 711/102 |
| 6,249,872 B1 * | 6/2001 | Wildgrube et al. ............... 726/2 |
| 7,165,135 B1 | 1/2007 | Christie et al. |
| 7,681,026 B2 * | 3/2010 | Martinez ........................... 713/1 |
| 7,962,752 B2 * | 6/2011 | Brickell et al. ............... 713/178 |
| 2001/0056518 A1 * | 12/2001 | Maeda ........................... 711/103 |
| 2004/0210764 A1 | 10/2004 | McGrath et al. |
| 2004/0221152 A1 * | 11/2004 | Martinez ........................... 713/100 |
| 2008/0163331 A1 * | 7/2008 | Datta et al. ........................ 726/1 |

FOREIGN PATENT DOCUMENTS

| EP | 1072975 A2 * | 1/2001 |
|---|---|---|
| EP | 357454 A1 | 10/2003 |

* cited by examiner

*Primary Examiner* — Thomas Lee
*Assistant Examiner* — Aurel Prifti

(57) ABSTRACT

Systems and methods of securely updating BIOS are disclosed. One such system comprises a reprogrammable memory, a first and a second register, and comparison logic. The reprogrammable memory comprises a first portion and a protect input. The protect input is configured to disallow writes to at least the first portion when the memory protect input is at a first level, and to allow writes to at least the first portion when the protect input is at a second level; The comparison logic is configured to drive a comparison output to a third level responsive to the first and second registers having equal values, and to drive the comparison output to a fourth level responsive to the first and second registers having different values. The comparison output is electrically coupled to the memory protect input.

17 Claims, 5 Drawing Sheets

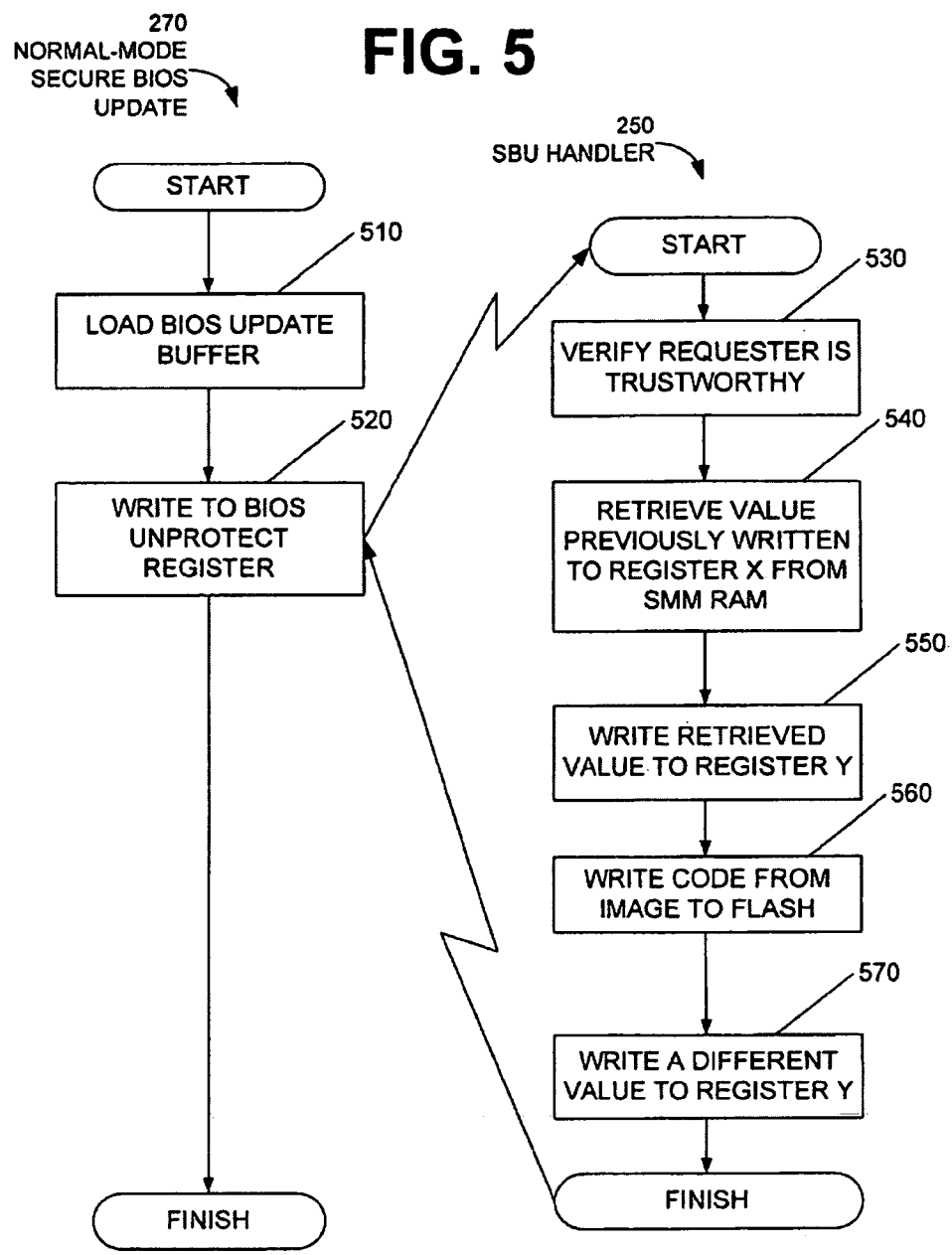

APPARATUS FOR DETERMINING DURING A POWER-ON SEQUENCE, A VALUE TO BE WRITTEN TO A FIRST REGISTER IN A SECURE AREA AND THE SAME VALUE TO A SECOND REGISTER IN NON-SECURE AREA, WHICH DURING A PROTECTED MODE, THE VALUE IS COMPARED SUCH THAT IF IT IS EQUAL, ENABLING WRITING TO A MEMORY

CROSS-REFERENCE TO RELATED APPLICATIONS

This Application claims the benefit of U.S. Provisional Application Ser. No. 61/082,549, filed Jul. 22, 2008, titled "Systems And Methods Of Secure BIOS Update" which is hereby incorporated by reference herein as if reproduced in full below.

BACKGROUND

Today's personal computer (PC) systems often store the Basic Input/Output System (BIOS) firmware in flash memory, and allow the BIOS to be updated by the user. Since the BIOS is an integral part of the system, users are vulnerable to a BIOS update that is performed by untrustworthy software, often referred to as "rogue software" or "malware".

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

FIG. 5 is a flow chart illustrating actions performed by some embodiments of the secure BIOS update-handler and normal-mode, secure BIOS update code of FIG. 1.

DETAILED DESCRIPTION

Figure 1:
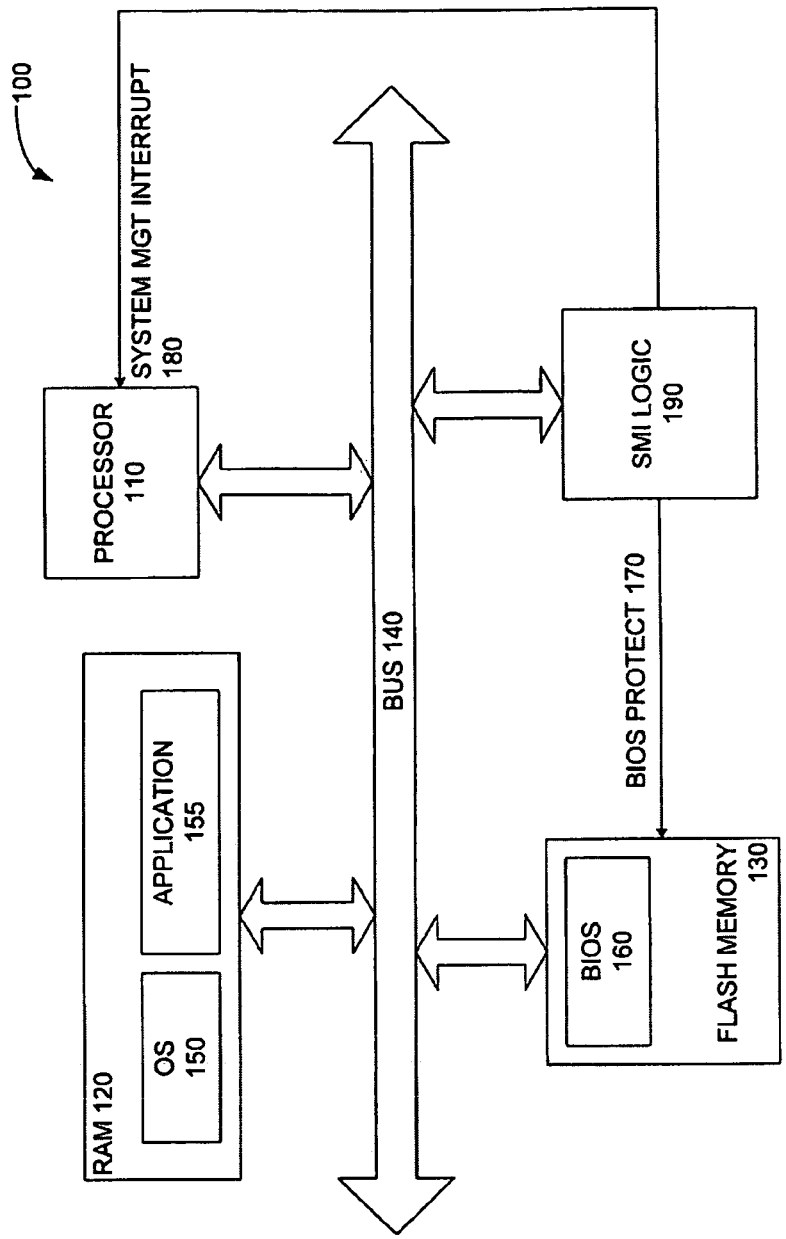
FIG. 1 is a block diagram of a system for secure BIOS update, according to some embodiments disclosed herein.

FIG. 1 is a block diagram of a computer system for secure BIOS update, according to some embodiments disclosed herein. Omitted from FIG. 1 are a number of conventional components that are unnecessary to explain the operation of system 100 as they are well known to those skilled in the art. Computer system 100 includes a processor 110, which accesses random access memory (RAM) 120 and flash memory 130 through a communications link, such as bus 140. RAM 120 contains code that is executed by processor 110, such as an operating system 150 and one or more applications 155. Flash memory 130 also contains executable code, in particular code 160, known as the Basic input Output System (BIOS). As understood by a person of ordinary skill in the art, BIOS 160 recognizes and controls various hardware devices that make up system 100 (e.g., keyboard, display, disk drive, universal serial bus hub, etc.). In some embodiments system 100 is a personal computer (PC) that is Intel x86 compatible, a computer server, a network attached storage server, and the like.

Flash memory 130 is a form of reprogrammable non-volatile memory. The systems and methods described herein allow BIOS 160 within flash memory 130 to be updated or reprogrammed in a secure manner. In this regard, flash memory 130 includes an input signal, memory protect 170, which controls whether or not write operations or writes by processor 110 to a particular portion of flash memory 130 are performed or honored. In some embodiments, the particular portion of flash memory 130 is BIOS 180. The techniques described herein ensure that processor 110 can change the state of memory protect signal 170 only from system management mode (SMM). As known to person of ordinary skill in the art, SMM is a mode of a processor's operation that is entered only in response to an input on a system management interrupt (SMI) pin 180. SMI pin 180 is electrically coupled to an interrupt output generated by SMI logic 190. For simplicity, the signal arriving at processor 110 on SMI pin 180 will hereinafter be referred to as SMI 180.

Secure updating of BIOS 160 will be further explained in connection with the block diagram of FIG. 2, which illustrates various portions of memory, both flash 130 and RAM 120. BIOS 160 within flash memory 130 includes code 210 which is executed at power on or reset. Power on code 210 includes secure BIOS update (SBU) power on code 220, which initializes SMI logic 190. A portion (230) of RAM 120 is visible to processor 110 only when executing in SMM mode. SMM RAM 230 includes both code and data. A system management interrupt handler 240 executes from SMM RAM 230 in response to system management interrupt 180 (FIG. 1). After determining the particular reason for the interrupt, SMI handler 240 may transfer control to a subhandler. The example embodiment of FIG. 2 includes such a subhandler, secure BIOS update handler 250, which interacts with SMI logic 190 to provide secure updates of BIOS 160. SMM RAM 230 also includes SMM scratchpad area 260, a data area which allows power on code 210 and secure BIOS update handler 250 to communicate, while making data used by these modules inaccessible by other non-SMM code.

RAM 120 also includes normal-mode secure BIOS update code 270, which does not execute in SMM mode. Normal-mode secure BIOS update code 270 does, however, interact with secure BIOS update handler 250 by triggering SMI interrupts. Details of normal-mode secure BIOS update code 270 and secure BIOS update handler 250 will be discussed below in connection with FIGS. 4-5.

Figure 3:
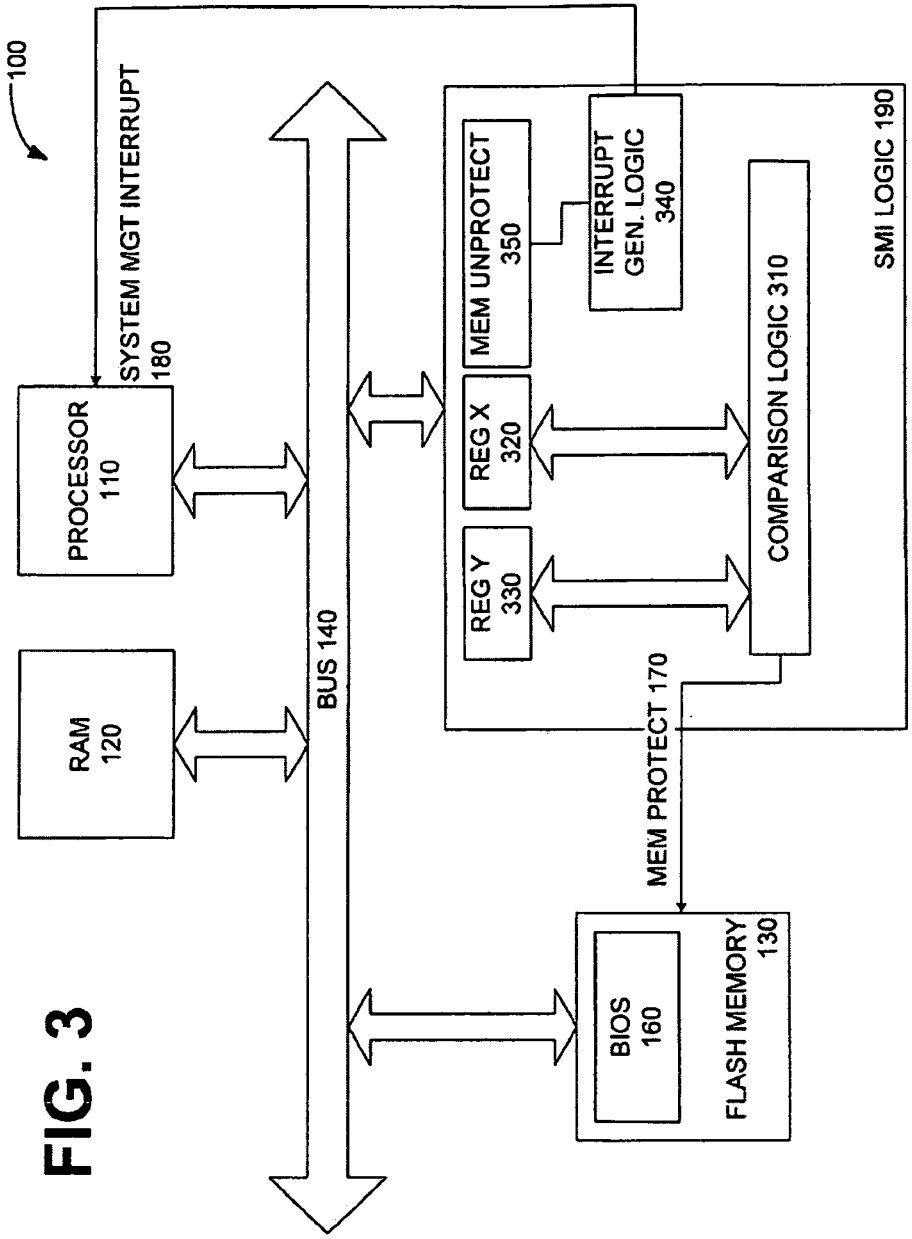
FIG. 3 is a block diagram of the system from FIG. 1, illustrating further details of the SMI logic from FIG. 1, according to some embodiments disclosed herein.

FIG. 3 is a block diagram of system 100 illustrating further details of SMI logic 190, according to some embodiments disclosed herein. As described earlier, memory protect signal 170 determines whether or not writes to BIOS 160 are honored. Memory protect signal 170 is generated by comparison logic 310 within SMI logic 190. Comparison logic 310 generates memory protect signal 170 by comparing the values in two registers, register X (320) and register Y (330): in response to register X (320) having the same value as register Y (330), comparison logic 310 deasserts memory protect signal 170; in response to register X (320) having a different value than register Y (330), comparison logic 310 asserts memory protect signal 170.

Notably, processor 110 does not have direct control of memory protect signal 170. However, processor 110 can write to register X (320) and register Y (330) over bus 140. Thus, processor 110 can effectively control memory protect signal 170 by writing the same value to register X (320) and register Y (330). Even so, the techniques described herein greatly reduce the probability that code running outside of SMM mode can write the same value to these two registers.

Figure 2:
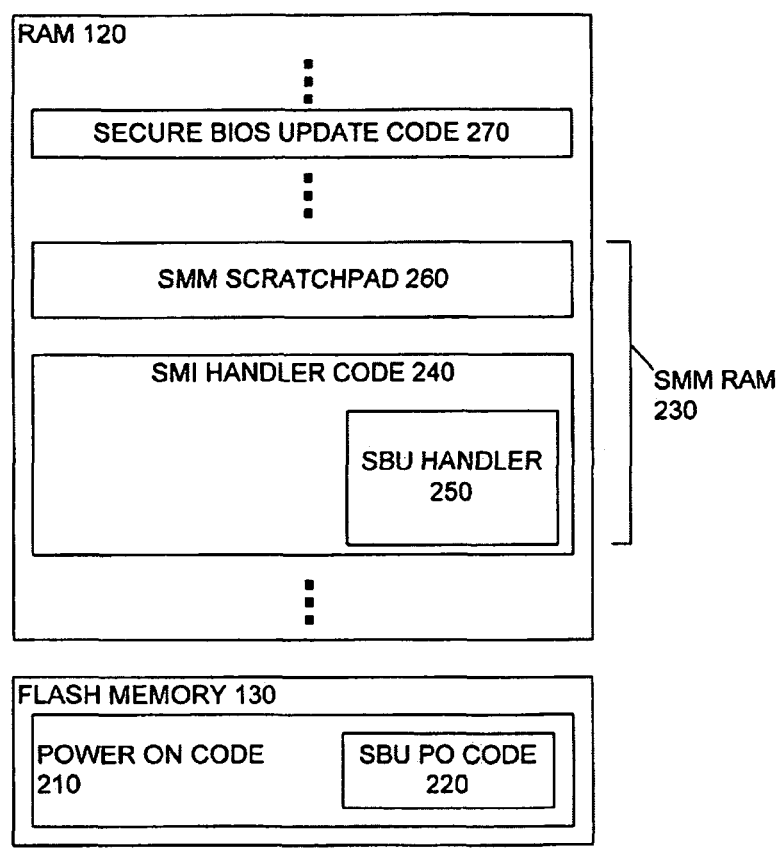
FIG. 2 illustrates various portions of flash memory and RAM from FIG. 1.

More specifically, using techniques further described below in connection with FIGS. 4-5, power on code 210 (see FIG. 2) writes a particular value to register X (320), then saves that particular value into SMM scratchpad 250 (FIG. 2). Later, secure BIOS update handler 250 (FIG. 2) retrieves the value from BUM scratchpad 260 and writes it to register Y (330). Since SMM scratchpad 260 is accessible to processor 110 only in SMM mode, and register X (320) is a writs-only register (i.e., a read by processor 110 after a write will not return the value written), code that is running outside of SMM mode after power up does not "know" the correct value to write to register Y (330) in order to match the value written to register X (320).

In addition to registers X (320) and Y (330), SMS logic 190 also includes logic 340 for generating an interrupt, which is electrically coupled to processor 110. Interrupt generation logic 340 may assert SMI 180 under a variety of conditions. One such condition is when processor 110 writes to a memory unprotect register 350. Thus, when processor 110 writes to memory unprotect register 350, SMI 180 is generated and SMI handler 240 (FIG. 2) executes in SMM mode. SMI handler 240 invokes secure BIOS update handler 250 (FIG. 2) after determining the reason for SMI 180 to be a write to memory unprotect register 350. In some embodiments, memory unprotect register 350 is not a separate register, but is implemented as a single bit which is part of an SMI control register (not shown). SMI logic 190 may contain other registers such that logic 340 also generates SMI 180 in response to reads and/or writes to these locations. In some embodiments of system 100, SMI handler 240 reads an SMI status register (not shown) which indicates what particular event caused SMI 180 to be generated.

Once control is transferred from SMI handler 240, secure BIOS update handler 250 determines whether the write to memory unprotect register 350 originates from trustworthy code or from suspect code, using a variety of techniques (such as, but not limited to, those described below in connection with FIGS. 4-5). If the requesting code is trustworthy, secure BIOS update handler 250 unprotects BIOS 160, by writing the value stored in SMM scratchpad 260 to register Y (330). This gates the enable of memory protect signal 170 that is produced by comparison logic 310.

On the other hand, if the write to memory unprotect register 350 originates from a suspect source, secure BIOS update handler 250 does not unprotect BIOS 160: memory protect signal 170 is not deasserted, and subsequent writes to BIOS 180 (e.g., by the suspect code) do not affect BIOS 160.

Although the results of a write to memory unprotect register 350 may in fact unlock BIOS 160, non-SMM code may use this write as a general mechanism to invoke secure BIOS update handler 250. Therefore, some embodiments of secure BIOS update handler 250 do more than enable memory protect signal 170 and, after determining the requester code to be trustworthy, these embodiments perform a specific function in SMM mode or) behalf of the requester. One such embodiment performs a secure update of BIOS 160 in SMM mode on behalf of a non-SMM-mode requester, as will be further explained in connection with the flow charts of FIGS. 4-5.

Figure 4:
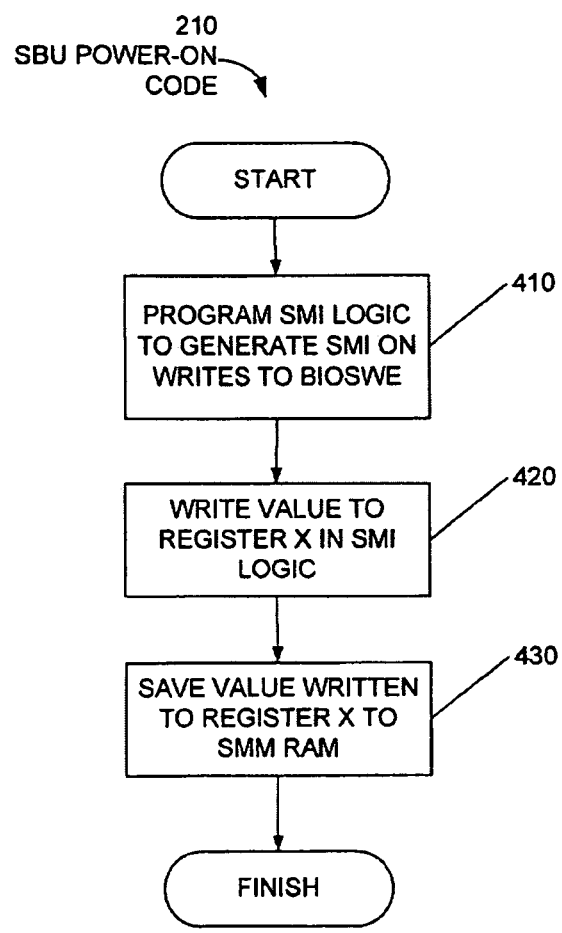
FIG. 4 is a flow chart illustrating actions performed by some embodiments of the power on code from FIG. 1.

FIG. 4 is a flow chart illustrating actions performed by some embodiments of power on code 210. As its name suggests, power on code 210 executes a power on, typically during the power on self-test (POST). In some embodiments, power on code 210 executes before the execution of option ROM by POST code. Only the portion of power-on that is related to secure update of the BIOS will be discussed here; the entire power-on sequence performs many actions that are unrelated and thus unnecessary to discuss here.

Power on code 210 begins with block 410, which programs SMI logic 190 so that a SMI 180 is generated whenever processor 110 writes to memory unprotect register 350. Thus, after power up SMI handler 240 will be executed whenever any software attempts to unprotect BIOS 160. Some embodiments also program SMI logic 190 so that SMI generation on writes to memory unprotect register 350 cannot be disabled (i.e., the feature is locked after enable). In other embodiments, SMI logic 190 itself locks this feature once enabled, so that locking by software is unnecessary.

Processing continues with block 420, where a specific value is written to register X 320. In some embodiments, this specific value is a random or pseudo-random number, in some embodiments, this specific value is changed with every boot or power-up. At block 430, the same value is saved to a memory location that is accessible to code executing in SMM mode, such as secure BIOS update handler 250. In some embodiments, this memory is located in SMM RAM 230. Processing by power on code 210 is then complete.

FIG. 5 is a flow chart illustrating actions performed by some embodiments of secure BIOS update handler 250 and normal-mode secure BIOS update code 270. As its name suggests, normal-mode secure BIOS update code 270 executes in a mode other than SMM mode. In some embodiments, code 270 takes the form of a device driver or a utility application. Code 270 can be viewed as the code that drives the secure BIOS update process, although code 270 relies on operations performed by secure BIOS update handler 250.

Normal-mode secure BIOS update code 270 begins with block 510, which loads a buffer with the image of the update for BIOS 160. The image buffer is accessible to both normal-mode code 270 and secure BIOS update handler 250. In some embodiments, this image contains the entire BIOS 160. In other embodiments, this image contains only a portion of BIOS 160. The name and/or location of the image file may be specified by a user, or may be predetermined. Processing continues at block 520, where normal-mode code 270 triggers a system management interrupt (SMI) by writing to memory unprotect register 350. As described earlier, the result of an SMI is the execution of SMI handler 240 in SMM mode, and since this SMI was a result of a write to memory unprotect register 350, control is transferred to secure BIOS update handler 250. This asynchronous transfer is control is graphically represented in FIG. 5 by a jagged arrow from left to right.

Processing then continues at block 530, where secure BIOS update handler 250 verifies that the code that wrote to memory unprotect register 350 is trustworthy. Various techniques can be used to determine trustworthiness. A technique that provides some level of security involves handler 250 looking for a particular signature written to a register location within SMI logic 190. Presumably, this signature is known to trustworthy code but not known to untrustworthy code. A higher level of security is provided when the image buffer prepared by normal-mode code 270 is digitally "signed" with an encryption key. When the BIOS image is created (at development time), a signature is computed with a private key and the signature is stored. In this manner, the image buffer is digitally "signed". To determine trustworthiness at runtime, handler 250 independently computes a signature using a public key contained within the image buffer (or one of the secure BIOS handlers), and compares the computed signature with the stored signature. If the signatures match, the BIOS is trustworthy. If handier 250 determines that the requester code is not trustworthy, the handler returns without updating BIOS 160.

However, if handler 250 determines that the request code is trustworthy, the handler prepares to update BIOS 160 by disabling memory protect signal 170. To do so, handier 250 retrieves (block 540) retrieves the value previously written by power on code 210 to register X (320) and stored in a shared location (e.g., SMM RAM 230). At block 550, the retrieved value is written to register Y (330). The presence of the same value in register X (320) and register Y (330) causes SMI logic 190 to deassert memory protect signal 170, thus allowing writes to BIOS 160. Next, at block 550, code from the image prepared by normal-mode code 270 is written to BIOS 160, using techniques known to a person of ordinary skill in the art. When writes to BIOS 160 are finished, block 570 locks or protects BIOS 160 again by writing a different value to register Y (330), causing SMI logic 190 to assert memory protect signal 170 once again. Processing by secure BIOS update handler 250 is then complete, the processor exits out of SMM mode, and control returns to normal-mode secure BIOS update code 270. Code 270 optionally performs some clean-up or post-processing (not shown), and processing is complete.

SMI logic 190 can be implemented in hardware, including, but not limited to, a programmable logic device (PLD), programmable gate stray (PGA), field programmable gate array (FPGA), an application-specific integrated circuit (ASIC), a system on chip (SoC), and a system in package (SIP).

Software component described herein, such as secure BIOS update handier 250, normal-mode secure BIOS update code 270, and Power on code 210, can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or propagation medium that is based, on electronic, magnetic, optical, electromagnetic, infrared, or semiconductor technology.

Specific examples of a computer-readable medium using electronic technology would include (but are not limited to) the following: an electrical connection (electronic), having one or more-wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) an optical fiber and a portable compact disk read-only memory (CD-ROM).

The flow charts herein provide examples of the operation of various software components, according to embodiments disclosed herein. Alternatively, these diagrams may be viewed as depicting actions of an example of a method implemented by such software components. Blocks in these diagrams represent procedures, functions, modules, or portions of code which include one or more executable instructions for implementing logical functions or steps in the process. Alternate embodiments are also included within the scope of the disclosure. In these alternate embodiments, functions may be executed out of order from that shown or discussed, including substantially concurrently or in reverse order, depending on the functionality involved. Not ail steps are required in all embodiments.

The foregoing description, for purposes of explanation, has been described with reference to specific embodiments. However, the illustrative discussions above are not intended to be exhaustive or to limit the invention to the precise forms disclosed. Many modifications and variations are possible in view of the above teachings. The embodiments were chosen and describe in order to best explain the principles of the invention and its practical applications, to thereby enable others skied in the art to best utilize the invention and various embodiments with various modifications as are suited to the particular use contemplated.

What is claimed is:

1. A computer-implemented method comprising:
   during a power-on sequence:
      determining a value to be written to a first register in a device, the device generating a signal which controls writes to a reprogrammable memory;
      saving the value to a location accessible in system management mode; and
      writing the value to the first register in the device;
   while executing in the system management mode:
      retrieving the saved value from the location;
      writing the retrieved value to a second register in the device; and
      responsive to a comparison indicating that the value written to the second register is equal to the value written to the first register, enabling a write to the reprogrammable memory;
   while executing in a mode other than the system management mode:
      writing to a third register in the device to effect a system management interrupt,
   wherein the retrieving the saved value occurs responsive to the system management interrupt.

2. The method of claim 1, wherein the writing the retrieved value to the second register in the device acts as a write enable signal for the reprogrammable memory.

3. The method of claim 1, further comprising:
   during each of a plurality of power-on sequences, selecting a different value as the value to be written to the first register.

4. The method of claim 1, further comprising:
   writing a value other than the retrieved value to the second register in the device, during the system management mode and responsive to completion of the writing to the reprogrammable memory.

5. The method of claim 1, further comprising:
   while executing in the mode other than the system management mode:
      before writing to the third register, loading a buffer with an image of code to be written to the reprogrammable memory.

6. The method of claim 1, wherein enabling the write comprises the device setting the signal that controls writes to the reprogrammable memory to a predetermined state.

7. The method of claim 1, wherein determining the value to be written to the first register comprises determining a random number to be written to the first register.

8. The method of claim 1, wherein the device includes system management interrupt logic including the first and second registers and a comparison logic to compare the value written to the first register with the value written to the second register, and wherein an output of the comparison logic controls enabling or disabling of the write to the reprogrammable memory.

9. A computer-implemented method comprising:
during a power-on sequence:
determining a value to be written to a first register in a device, the device generating a signal which controls writes to a reprogrammable memory;
saving the value to a location accessible in system management mode; and
writing the value to the first register in the device;
while executing in the system management mode:
retrieving the saved value from the location;
writing the retrieved value to a second register in the device; and
responsive to a comparison indicating that the value written to the second register is equal to the value written to the first register, enabling a write to the reprogrammable memory;
while executing in a mode other than the system management mode:
writing to a third register in the device,
wherein the retrieving the saved value occurs responsive to the writing to the third register device.

10. A system comprising:
a memory having power on code and a system management interrupt handler stored thereon;
a processor configured by the power on code to:
determine a value to be written to a first register in a device, the device generating a signal which enables writes to a reprogrammable memory;
save the value to a location accessible in system management mode; and
write the value to the first register in the device;
wherein the processor is configured by the system management interrupt handler to:
retrieve the saved value from the location;
write the retrieved value to a second register in the device; and
responsive to a comparison indicating that the value written to the second register is equal to the value written to the first register, enable a write to the reprogrammable memory,
wherein the processor is configured to further:
while the system is in a mode other than the system management mode, write to a third register in the device to effect a system management interrupt;
wherein the retrieving of the saved value occurs responsive to the system management interrupt.

11. The system of claim 10, wherein the processor is further configured by the power on code to:
pseudo-randomly generate the value to be written to the first register.

12. The system of claim 10, wherein the processor is further configured by the power on code to:
on each power on cycle, select a different value as the value to be written to the first register.

13. The system of claim 10, the memory having normal-mode update code stored thereon, wherein the processor is configured by the normal-mode update code to:
load a buffer with an image of code to be written to the reprogrammable memory; and
wherein the processor is further configured by the system management interrupt handler to:
write the buffer to the reprogrammable memory, responsive to writing the retrieved value.

14. The system of claim 13, wherein the processor is further configured by the system mode interrupt handler code to:
write a value other than the retrieved value to the second register in the device, responsive to completion of the writing of the buffer to the reprogrammable memory.

15. The system of claim 10, wherein enabling of the write to the reprogrammable memory comprises setting the signal that is input to the reprogrammable memory to a predetermined state.

16. The system of claim 10, wherein the value to be written to the first register comprises a random number.

17. The system of claim 10, further comprising system management interrupt logic including the first register and second register, and a comparison logic to compare the value written to the first register with the value written to the second register, and wherein an output of the comparison logic controls enabling or disabling of the write to the reprogrammable memory.

* * * * *